United States Patent
Miyano et al.

(10) Patent No.: US 9,571,932 B2
(45) Date of Patent: Feb. 14, 2017

(54) ELECTRONIC DEVICE

(71) Applicant: KYOCERA CORPORATION, Kyoto (JP)

(72) Inventors: Tomoaki Miyano, Kameyama (JP); Tomohiro Inagaki, Yokohama (JP); Kenichi Ozasa, Yokohama (JP); Satoshi Mizuta, Sagamihara (JP); Kiyokazu Sato, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 155 days.

(21) Appl. No.: 14/404,590

(22) PCT Filed: May 24, 2013

(86) PCT No.: PCT/JP2013/003310
§ 371 (c)(1),
(2) Date: Nov. 28, 2014

(87) PCT Pub. No.: WO2013/179629
PCT Pub. Date: Dec. 5, 2013

(65) Prior Publication Data
US 2015/0110318 A1 Apr. 23, 2015

(30) Foreign Application Priority Data

May 29, 2012 (JP) ................................. 2012-122505

(51) Int. Cl.
*H04R 3/00* (2006.01)
*H04R 3/02* (2006.01)
(Continued)

(52) U.S. Cl.
CPC ............... *H04R 3/02* (2013.01); *B06B 1/0603* (2013.01); *B06B 1/0611* (2013.01); *B06B 3/00* (2013.01);
(Continued)

(58) Field of Classification Search
USPC ......................................................... 381/94.1
See application file for complete search history.

(56) References Cited

U.S. PATENT DOCUMENTS 4,517,417 A * 5/1985 Murayama ............... A42B 3/30
379/430
5,115,472 A * 5/1992 Park ........................ H04R 1/028
310/324

(Continued)

FOREIGN PATENT DOCUMENTS

JP 02-206266 A 8/1990
JP 2003-032780 A 1/2003
(Continued)

OTHER PUBLICATIONS

Written Opinion of the International Searching Authority; PCT/JP2013/003310; Sep. 3, 2013; with concise explanation.
(Continued)

*Primary Examiner* — Amir Etesam
(74) *Attorney, Agent, or Firm* — Studebaker & Brackett PC (57) ABSTRACT

Provided is an electronic device including: a housing; a vibration body disposed in the housing; and a microphone disposed in the housing. By vibrating the vibration body, the electronic device transmits air conduction sound and vibration sound that is generated by the vibration. During the generation of the sounds, howling reduction processing is performed, so that usability of the electronic device is improved.

22 Claims, 6 Drawing Sheets (51) Int. Cl.
*H04R 17/00* (2006.01)
*H04M 1/03* (2006.01)
*B06B 1/06* (2006.01)
*B06B 3/00* (2006.01)
*G10K 9/122* (2006.01)
*H04R 7/04* (2006.01)
*H04R 25/00* (2006.01)
*H04M 1/60* (2006.01)

(52) U.S. Cl.
CPC ............. *G10K 9/122* (2013.01); *H04M 1/035* (2013.01); *H04R 7/045* (2013.01); *H04R 17/00* (2013.01); *H04R 25/453* (2013.01); *H04M 1/6033* (2013.01); *H04R 2499/11* (2013.01)

(56) References Cited

U.S. PATENT DOCUMENTS

2003/0012388 A1  1/2003  Ura
2004/0062411 A1* 4/2004  Retchin ............... H04R 1/1066
                                                 381/376

FOREIGN PATENT DOCUMENTS

| JP | 2003-244792 A | 8/2003 |
| JP | 2004-187031 A | 7/2004 |
| JP | 2005-348193 A | 12/2005 |
| JP | 2007-082009 A | 3/2007 |
| JP | 2011-091719 A | 5/2011 |

OTHER PUBLICATIONS

International Search Report; PCT/JP2013/003310; Sep. 3, 2013; with concise explanation.

* cited by examiner

ELECTRONIC DEVICE

CROSS-REFERENCE TO RELATED APPLICATION

This application claims priority to and the benefit of Japanese Patent Application No. 2012-122505 filed on May 29, 2012, the entire contents of which are incorporated herein by reference.

TECHNICAL FIELD

The present invention relates to an electronic device that includes a housing and a vibration body held by the housing and that transmits sound through cartilage conduction by pressing the vibration body to an ear of a user.

BACKGROUND

Patent Literature 1 describes an electronic device such as a mobile phone that transmits air conduction sound and bone conduction sound to a user. Patent Literature 1 also describes that the air conduction sound is sound perceived by an auditory nerve of a user as a result of an eardrum being vibrated by an air vibration that is created by a vibration of an object and that travels through an external auditory canal down to the eardrum. Furthermore, Patent Literature 1 describes that the bone conduction sound is transmitted to the auditory nerve of the user through a part of a user's body (e.g. a cartilaginous portion of an external ear) that is in contact with the vibrating object.

In the mobile phone described in Patent Literature 1, a rectangular plate-shaped vibration body configured by piezoelectric bimorph and a flexible material is attached to an outer surface of a housing via an elastic member. Patent Literature 1 also describes that, upon application of a voltage to the piezoelectric bimorph of the vibration body, the piezoelectric material is expanded and contracted in a longitudinal direction, thereby causing the vibration body to undergo flexure vibration. As a result, when the user places the vibration body in contact with an auricle, the air conduction sound and the bone conduction sound are transmitted to the user.

CITATION LIST

Patent Literature

Patent Literature 1: Japanese Patent Application Publication No. 2005-348193

SUMMARY OF INVENTION

Technical Problem

However, in the electronic device described in Patent Literature 1, the vibration body is attached to the outer surface of the housing of the mobile phone or the like, and sound is transmitted by vibrating the vibration body. Accordingly, Patent Literature 1 does not take into consideration a problem faced by an electronic device of a type that transmits air conduction sound and vibration sound by vibrating a panel such as a protection panel of a display surface.

The present invention is to provide an electronic device of a type that transmits vibration sound by vibrating a panel while usability of the electronic device is achieved.

Solution to Problem

One aspect of the present invention resides in an electronic device, including: a housing; a vibration body disposed in the housing; and a microphone disposed in the housing. By vibrating the vibration body, the electronic device transmits air conduction sound and vibration sound that is generated by the vibration. During the generation of the sounds, howling reduction processing is performed.

Advantageous Effects of Invention

Provided is an electronic device of a type that transmits vibration sound by vibrating a penal while usability of the electronic device is improved.

BRIEF DESCRIPTION OF DRAWINGS

The present invention will be further described below with reference to the accompanying drawings, wherein.

DESCRIPTION OF EMBODIMENTS

Embodiments of the present invention will be described with reference to the accompanying drawings.

Figure 1:
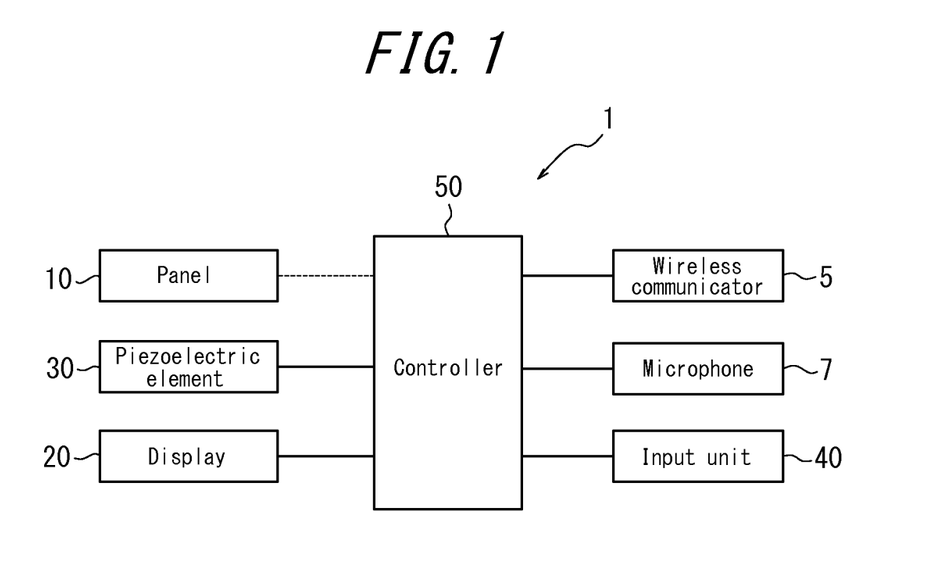
FIG. 1 is a function block diagram of a part of an electronic device according to one embodiment.

FIG. 1 is a function block diagram of a part of an electronic device 1 according to one embodiment of the present invention. The electronic device 1 is an openable/closable mobile phone that may be switched between a closed state where two housings having a voice communication function are overlapped on each other in a large area and an opened state where the two housings are overlapped in a small or no area. For example, the electronic device 1 may be of a folding type or a slide type. The electronic device 1 includes a wireless communicator 5, a microphone 7, a panel 10, a display 20, a piezoelectric element 30, an input unit 40, and a controller 50. The wireless communicator 5 has a general configuration and is wirelessly connected to a communication network via a base station or the like. The microphone 7 is configured by a known microphone such as a capacitor microphone and is configured to collect sound such as transmission sound that a user utters while a voice communication is in progress via the wireless communicator 5. When the electronic device 1 according to the present embodiment functions as a mobile phone, sound which is transmitted to an inner part of the human body is generated by vibration of the panel 10 generated by the piezoelectric element 30. The sound to be transmitted to an inner part of the human body passes through a soft tissue of the human body (e.g. a cartilage) to vibrate a middle ear or an inner ear.

The panel 10 may be a touch panel that is configured to detect a contact or a cover panel that protects the display 20. The panel 10 may be made of glass or a synthetic resin such as acryl. The panel 10 preferably has a plate shape. The panel 10 may be a flat plate or a curved panel having a gradually inclined surface. When the panel 10 is the touch panel, the panel 10 detects a contact made by a finger of a user, a pen, a stylus pen, or the like. The touch panel may detect a contact using any type, such as a capacitive type, a resistive film type, a surface acoustic wave type (or an ultrasonic type), an infrared type, an electromagnetic induction type, and a load detection type.

The display 20 is a display device such as a liquid crystal display, an organic EL display, and an inorganic EL display. The display 20 is disposed at a back of the panel 10. For example, the display 20 may be disposed on a back surface of the panel 10 using a joining member (e.g. an adhesive agent). As another example, the display 20 may be supported by a housing of the electronic device 1 such that the display 20 is spaced apart from the panel 10.

The piezoelectric element 30 is an element that is configured to undergo expansion and contraction or bending (flexure) in accordance with an electromechanical coupling factor of a constituent material in response to an electric signal (voltage) applied thereto. As a material of the element, ceramic and crystal are used, for example. The piezoelectric element 30 may be a unimorph, a bimorph, or a laminated-type piezoelectric element. The laminated piezoelectric element includes a laminated unimorph element in which layers (e.g. 16 or 24 layers) of unimorph are laminated or a laminated bimorph element in which layers (e.g. 16 or 24 layers) of bimorph are laminated. The laminated-type piezoelectric element is configured, for example, by a laminated structure of a plurality of dielectric layers made of PZT (lead zirconate titanate) and electrode layers each disposed between adjacent ones of the dielectric layers. Unimorph undergoes expansion and contraction in response to an electric signal (voltage) applied thereto, and bimorph undergoes flexure in response to an electric signal (voltage) applied thereto.

The piezoelectric element 30 is disposed on the back surface of the panel 10 (i.e. a surface of an inner side of the electronic device 1). The piezoelectric element 30 is attached to the panel 10 by a joining member (e.g. a double-sided adhesive tape). The piezoelectric element and the panel may be collectively referred to below as a vibration body. The piezoelectric element 30 may also be attached to the panel 10 via an intermediate member (e.g. a metal plate). The piezoelectric element 30 is disposed on the back surface of the panel 10 such that the piezoelectric element 30 is at a predetermined distance from the surface of the inner side of a housing.

Preferably, the piezoelectric element 30 remains at a predetermined distance from the surface of the inner side of the housing even in a state where the piezoelectric element 30 undergoes expansion and contraction or flexure. That is to say, the distance between the piezoelectric element 30 and the surface of the inner side of the housing is preferably greater than a maximum amount of deformation of the piezoelectric element 30.

The input unit 40 is configured to receive an operation input from the user and is configured by an operation button (an operation key), for example. When the panel 10 is the touch panel, the panel 10 is also capable of receiving an operation input from the user by detecting a contact made by the user.

The controller 50 is a processor configured to control the electronic device 1. While a voice communication is in progress, the controller 50 processes a sound signal that is collected and electro-acoustically transduced by the microphone 7, and the controller 50 also transmits the processed sound signal from the wireless communicator 5. The controller 50 applies, to the piezoelectric element 30, a predetermined electric signal (voltage corresponding to a sound signal representing voice of a party on the phone, a side tone, music including a phone melody or a tune, or the like). The sound signal may be based on music data stored in an internal memory or may be reproduced according to music data stored in an external server and the like via the network.

An open/close detector is configured by using a Hall element disposed on one of the housings and a magnetic force generating member disposed on the other one of the housings. When electronic device reaches or approaches the closed state, the Hall element detects the closed state by detecting magnetic force.

When applied with an electric signal, the piezoelectric element 30 undergoes expansion and contraction or flexure in a longitudinal direction thereof. In this regard, the panel 10 attached with the piezoelectric element 30 is deformed in conjunction with expansion and contraction or flexure of the piezoelectric element 30, thus resulting in a flexure vibration of the panel 10. The panel 10 undergoes flexure in response to expansion and contraction or flexure of the piezoelectric element 30. The panel 10 is bent directly by the piezoelectric element 30. The state in which the "panel 10 is bent directly by the piezoelectric element" differs from a phenomenon in which the panel is deformed when a certain area of the panel is vibrated due to inertial force of a piezoelectric actuator including the piezoelectric element provided in a casing as adopted in an existing panel speaker. The state in which the "panel 10 is bent directly by the piezoelectric element" includes a state in which the panel is bent directly by expansion and contraction or bending (flexure) of the piezoelectric element via the joining member or via the joining member and a reinforcing member which is later described. Here, a maximum voltage of the electric signal that the controller 50 applies to the piezoelectric element 30 may be ±15 V which is greater than ±5 V, that is, an application voltage of a so-called panel speaker for a purpose of sound conduction using not vibration sound but air conduction sound.

With the above configuration, even when the user forcefully presses the panel 10 against a user's body with force greater than or equal to 3 N (force ranging from 5 N to 10 N), the flexure vibration of the panel 10 occurs. As a result, vibration sound which is transmitted through a part of the user's body (e.g. a cartilaginous portion of an external ear) is generated. Note that an amount of the application voltage is appropriately adjustable according to how tightly the panel 10 is fixed to the housing or a support member or according to a capability of the piezoelectric element 30.

The flexure vibration is caused in an area of the panel 10 where the piezoelectric element 30 is disposed and in areas of the panel 10 that are away from the disposed area. The panel 10 includes, in the areas vibrated, a plurality of portions that is configured to vibrate in a direction intersecting with a main surface of the panel 10, and in each of the plurality of portions, a value indicating an amplitude of the vibration transitions over time from plus to minus or vice versa. The panel 10 is vibrated such that areas with relatively large amplitude of vibration and areas with relatively small amplitude of vibration are seemingly distributed randomly or in a cyclic manner across the panel 10 at a certain moment. In other words, the vibration of a plurality of wavelengths is detected across all areas of the panel 10. In order to prevent the aforementioned vibration of the panel 10 from being attenuated even when the user forcefully presses the panel 10 against the user's body with force ranging from, for example, 5 N to 10 N, the maximum voltage that the controller 50 applies to the piezoelectric element 30 may be ±15 V. The above configuration allows the user to listen to sound while placing the ear in contact with the areas of the panel 10, such as a middle portion of the panel 10, that are away from the area where the piezoelectric element 30 is disposed.

Figure 2:
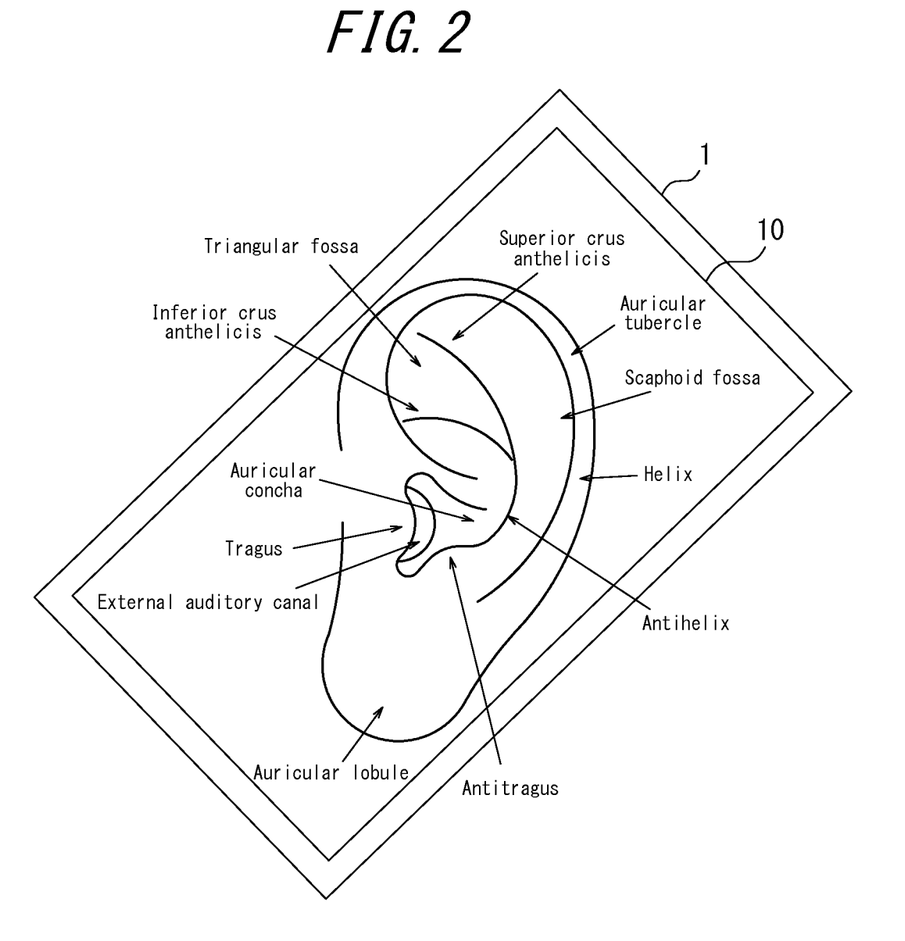
FIG. 2 illustrates a preferable shape of a panel.

The panel 10 may be substantially as large as the user's ear. As illustrated in FIG. 2, the panel 10 may also be larger than the user's ear. In this case, when the user listens to sound, the whole ear tends to be covered by the panel 10 of the electronic device 1. As a result, sound (noise) is prevented from entering through an external auditory canal. It is suffice for the vibration to occur in an area of the panel 10 that is larger than an area having a length corresponding to a distance from an inferior crus of antihelix (i.e. an inferior crus anthelicis) to an antitragus and a width corresponding to a distance from a tragus to an antihelix. It is preferable for the vibration to occur in an area of the panel 10 that is larger than an area having a length corresponding to a distance from a portion of a helix that is near a superior crus of antihelix (i.e. a superior crus anthelicis) to an auricular lobule and a width corresponding to a distance from the tragus to a portion of the helix that is near the antihelix. The areas having the above lengths and widths may have an oblong shape or an elliptical shape with as a major axis corresponding to the length and a minor axis corresponding to the width. Average ear size of the Japanese may be seen from the Japanese Body Dimension Database (1992-1994) or the like distributed by the Research Institute of Human Engineering for Quality Life (HQL). The panel 10 with a size greater than the average ear size of the Japanese would be generally capable of covering a whole ear of a foreigner as well. With the aforementioned dimension and shape, the panel 10 is capable of covering the user's ear, which offers tolerance to misalignment when the user presses the panel 10 to the ear.

By the vibration of the panel 10, the above electronic device 1 is capable of transmitting, to the user, air conduction sound and vibration sound which is transmitted through a part of the user's body (e.g. the cartilaginous portion of the external ear). Accordingly, when the panel 10 outputs sound at substantially the same volume level as a dynamic receiver, less amount of sound propagates to an external environment of the electronic device 1 due to the vibration of air resulting from the vibration of the panel 10, compared to a case of the dynamic receiver. Accordingly, the electronic device 1 is well-suited for a situation where a recorded message is listened to on the train and the like, for example.

Furthermore, since the above electronic device 1 transmits vibration sound by the vibration of the panel 10, even when the user wears an earphone or a headphone, the user is able to listen to sound though the earphone or the headphone and a portion of the body by placing the electronic device 1 in contact with the earphone and the headphone.

The above electronic device 1 transmits sound to the user by the vibration of the panel 10. Accordingly, in a case where the electronic device 1 is not provided with an additional dynamic receiver, it is not necessary to provide the housing with an opening (i.e. a sound discharge opening) for sound transmission. As a result, the waterproof structure of the electronic device is simplified. When the electronic device 1 is provided with a dynamic receiver, the sound discharge opening may be closed by a member that passes air through and blocks liquid. The member that passes air through and blocks liquid may be Gore-Tex™.

Figure 3A:
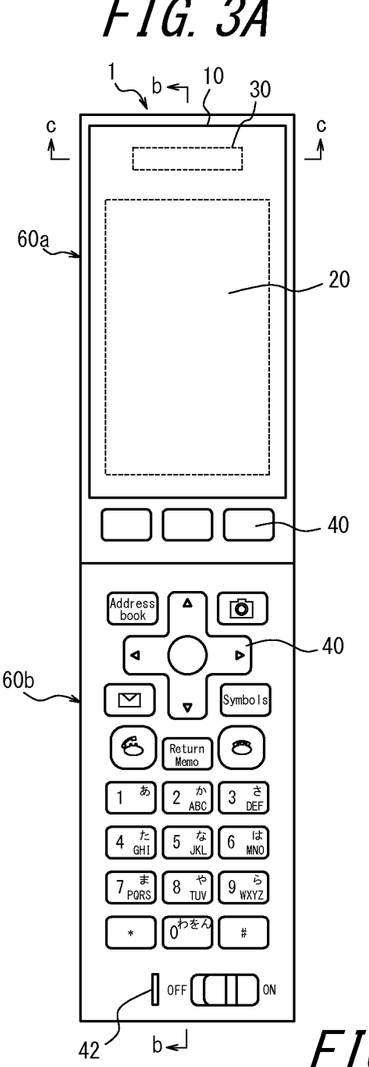
FIGS. 3A to 3C schematically illustrate a part of a housing structure of an electronic device according to one embodiment of the present invention.
Figure 3B:
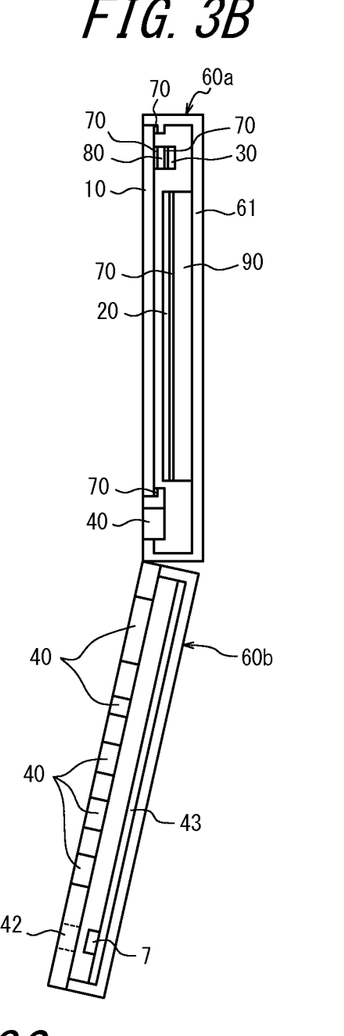
Figure 3C:
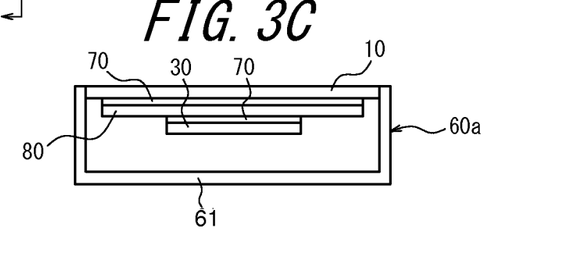

FIGS. 3A to 3C schematically illustrate a part of a housing structure of the electronic device 1 according to one embodiment. FIG. 3A is a front view, FIG. 3B is a sectional view taken along a line b-b of FIG. 3A, and FIG. 3C is a sectional view taken along a line c-c of FIG. 3A. The electronic device 1 illustrated in FIG. 3A-3C is a folding mobile phone in which a cover panel (e.g. an acryl plate), which serves as the panel 10 and is configured to cover the display 20, is provided on a front surface of an upper-side housing 60a, and the input unit 40 is provided in a lower-side housing 60b.

Between the panel 10 and the piezoelectric element 30, a reinforcing member 80 may be disposed. The reinforcing member 80 may be a resin plate, a metal plate, or a resin plate including glass fiber. That is to say, the electronic device 1 according to the one embodiment has a structure where the piezoelectric element 30 and the reinforcing member 80 are adhered by the joining member 70, and the reinforcing member 80 and the panel 10 are adhered by the joining member 70.

Furthermore, in the present embodiment, the display 20 is not adhered to the panel 10 but supported by the housing 60a. That is to say, the electronic device 1 according to the present embodiment has a structure where the display 20 is spaced apart from the panel 10, and the display 20 is adhered to the support portion 90, i.e., a part of the housing 60a, by the joining member 70. The support unit 90 is not limited to be configured as the part of the housing 60 and may be configured by metal, resin, or the like, as a member independent from the housing 60.

The lower-side housing 60b is provided with an opening 42. The lower-side housing 60b is also installed, in a circuit substrate 43 embedded in the housing 60b, with the microphone 7, such that the microphone 7 opposes to the opening 42. Accordingly, the microphone 7 has directivity directed toward a direction to which the input unit 40 faces.

According to the electronic device 1 of the present embodiment, the reinforcing member 80 and the panel 10 are deformed due to deformation of the piezoelectric element 30 attached to the panel 10 via the reinforcing member 80, and air conduction sound and vibration sound are transmitted to an object that is in contact with the deformed panel 10. Accordingly, air conduction sound and vibration sound are transmitted to the user without the need for pressing the piezoelectric element 30 itself to the ear. Furthermore, the piezoelectric element 30 is attached to the surface of the inner side of the housing 60a of the panel 10. Accordingly, air conduction sound and vibration sound are transmitted to the user without having to protrude the piezoelectric element 30 from an outer surface of the housing 60a. Moreover, the deformation is caused in the area of the panel 10, where the piezoelectric element 30 is disposed and in other areas of the panel 10, for transmission of air conduction sound and vibration sound. Accordingly, the user is able to hear air conduction sound transmitted through air and to hear vibration sound by placing the ear in contact with any position of the panel 10.

Furthermore, by disposing the reinforcing member 80 between the piezoelectric element 30 and the panel 10, when the panel 10 is applied with an external force, the applied external force is less likely to be transferred to the piezoelectric element 30 and damage the piezoelectric element 30.

Even when the panel 10 is forcefully pressed against the human body, the attenuation in the vibration of the panel 10 is reduced. Moreover, owing to the reinforcing member 80 disposed between the piezoelectric element 30 and the panel 10, a resonance frequency of the panel 10 is decreased, and sound characteristics in a low frequency range are improved. Note that instead of the reinforcing member 80 a plate-shaped weight may be attached to the piezoelectric element 30 by the joining member 70.

The panel 10 forms the touch panel of, for example, a capacitive type, and in this case, the panel 10 is supported by the housing 60a via the joining member 70. Thus, the panel 10 may be pressed with pressure ranging from 3N to 10N. The display 20 is connected to a circuit substrate 130. The piezoelectric element 30, which constitutes the vibration body together with the panel 10, is joined to the upper portion of the back surface of the panel 10 that is located on one end side in one direction of the panel 10 via the joining member 70. The piezoelectric element 30 has a rectangular shape and is joined to the panel 10 such that the major axis of the rectangular shape extends along a short side of the panel 10. The joining member 70 may be the adhesive agent, the double-sided adhesive tape, or the like having thermo-setting properties, ultraviolet-curable properties, or the like. For example, the joining member 70 may be an optical elastic resin, which is a colorless and transparent ultraviolet-curable acrylic adhesive agent.

The input unit 40 is supported by the housing 60b on the other side (i.e. a lower portion) of the panel 10 in the longitudinal direction thereof. As indicated by a broken line, the input unit 40 is provided with the microphone opening 42. That is to say, the piezoelectric element 30 is disposed on the upper portion of the rectangular housing 60a, and the opening 42 is formed on the lower portion of the housing 60b. The microphone 7 is installed in the circuit substrate 130 such that the microphone 7 opposes to the opening 42. Accordingly, the microphone 7 has directivity directed toward the direction to the face of the panel 10.

Figure 4:
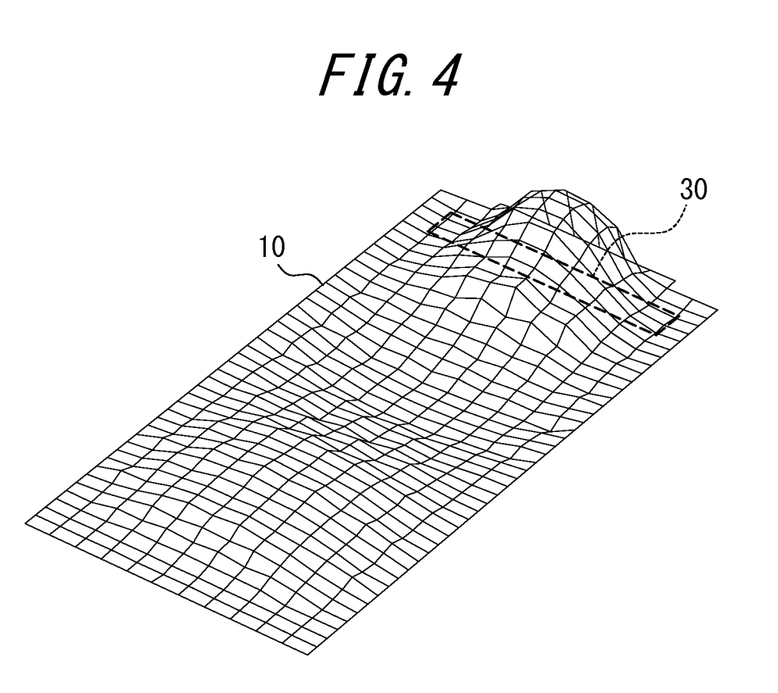
FIG. 4 illustrates one example of vibration of a panel of an electronic device according to the embodiment illustrated in FIGS. 3A to 3C.

FIG. 4 illustrates one example of the vibration of the panel 10 of the electronic device 1 according to one embodiment of the present invention. In the electronic device 1 according to the present embodiment, the panel 10 is the acryl plate with lower rigidity compared to the glass plate, and moreover, the display 20 is not adhered to the back surface of the panel 10. Accordingly, amplitude generated by the piezoelectric element 30 is larger than the case of an electronic device of a type to which the display 20 is adhered. The panel 10 in the upper portion thereof is bent directly by the piezoelectric element 30, and the vibration in the lower portion is attenuated compared to the vibration in the upper portion. The panel 10 is bent by the piezoelectric element 30 such that a portion of the panel 10 directly above the piezoelectric element 30 protrudes relative to neighboring portions of the panel 10 in a long-side direction of the piezoelectric element 30. The vibration is caused in an area of the panel 10 where the piezoelectric element 30 is disposed and in areas of the panel 10 that are away from the disposed area. Accordingly, the user is able to hear air conduction sound transmitted through air and to hear vibration sound by placing the ear in contact with any position of the panel 10.

The electronic device 1 according to the present embodiment performs the first or the second howling reduction processing in accordance with loudness of sound collected by the microphone 7.

Figure 5:
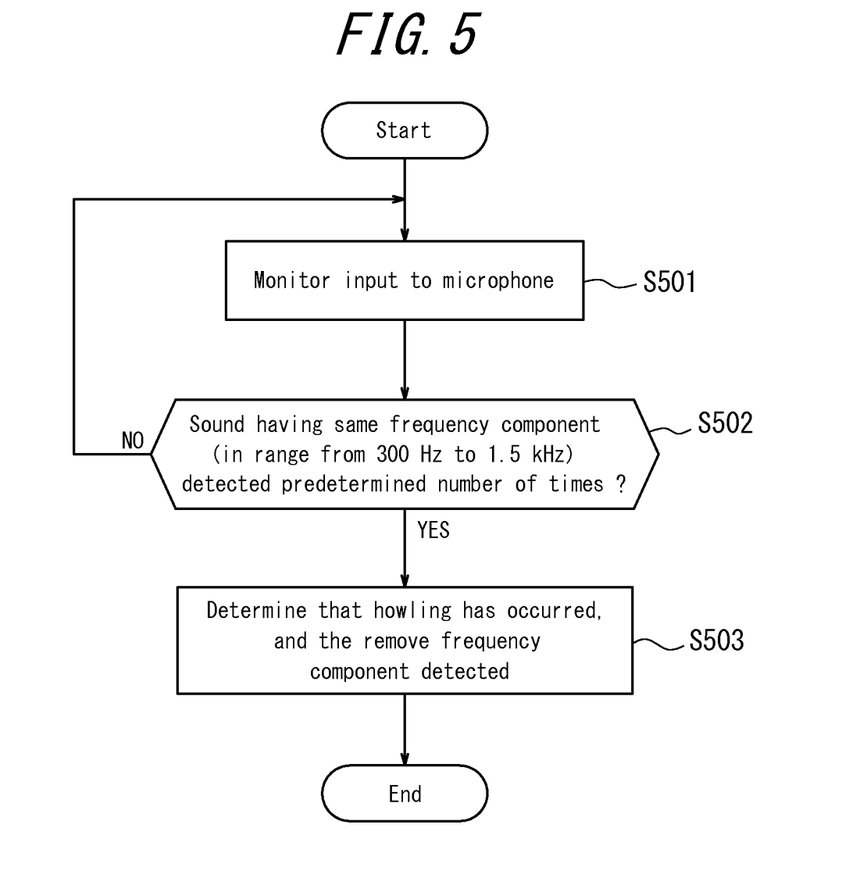
FIG. 5 is a flowchart illustrating operation of an electronic device according to the first howling reduction processing.

FIG. 5 is a flowchart illustrating operation of the first howling reduction processing performed by the electronic device 1 during execution of the voice communication function or the hearing aid function. The hearing aid function refers to a function of assisting hearing of users who suffer from hearing impairment, by collecting ambient sound by the microphone 7 and reproducing the collected sound at a higher volume by the speaker function.

In Step S501, when detecting an incoming voice communication by means of the wireless communicator 5 or an operation of executing the hearing aid function, the controller 50 activates the speaker function, and the controller 50 also monitors input to the microphone by analyzing the sound collected by the microphone 7. The monitored sound may be detected, for example, by sampling a signal outputted from the microphone 7 for a predetermined period of time and by subjecting the sampled output to frequency analysis performed in a sound frequency band used for transmission.

In Step S502, the controller 50 determines whether a sound having the same frequency is detected at least a predetermined number of times (e.g. five times) in a predetermined period of time within a predetermined range (e.g. in a low frequency band ranging from 300 Hz to 1.5 kHz). When it is determined that a sound having the same frequency is detected at least the predetermined number of times, processing moves to Step S503. When it is not determined that a sound having the same frequency is detected at least the predetermined number of times (e.g. five times), processing moves to Step S501.

In Step S503, since the sound having the same frequency is inputted at least the predetermined number of times, it is determined that howling has occurred. Accordingly, sound is reproduced based on a signal from which the sound having the same frequency that has been detected at least the predetermined number of times is reduced or removed. During the execution of the speaker function, Steps from S501 through S503 are preferably repeated.

Figure 6:
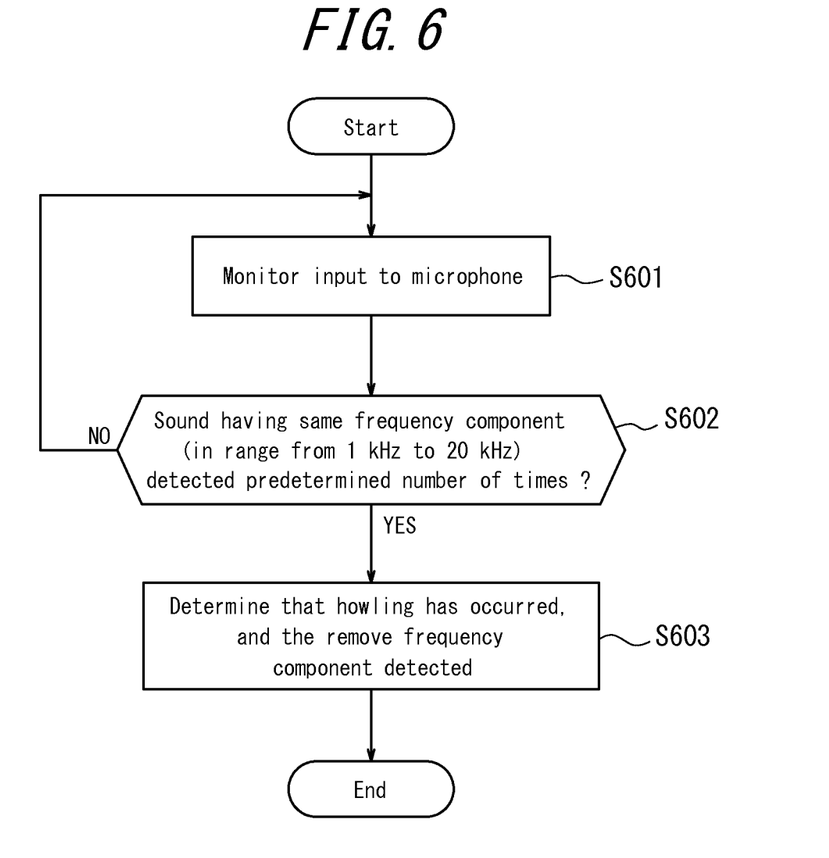
FIG. 6 is a flowchart illustrating operation of an electronic device according to the second howling reduction processing.

FIG. 6 is a flowchart illustrating operation of the second howling reduction processing performed by the electronic device 1 during execution of the voice communication function or the hearing aid function.

In Step S601, when detecting an incoming voice communication by means of the wireless communicator 5 or an operation of executing the hearing aid function, the controller 50 activates the speaker function, and the controller 50 also monitors input to the microphone by analyzing the sound collected by the microphone 7. The monitored sound may be detected, for example, by sampling a signal outputted from the microphone 7 for a predetermined period of time and by subjecting the sampled output to frequency analysis performed in a sound frequency band used for transmission.

In Step S602, the controller 50 determines whether a sound having the same frequency is detected at least a predetermined number of times in a predetermined period of time within a predetermined range (e.g. in a high frequency band ranging from 1 kHz to 20 kHz). When it is determined that a sound having the same frequency is detected at least the predetermined number of times, processing moves to Step S603. When it is not determined that a sound having the same frequency is detected at least the predetermined number of times (e.g. five times), processing moves to Step S601.

In Step S603, since the sound having the same frequency is inputted at least the predetermined number of times, it is determined that howling has occurred.

Accordingly, sound is reproduced while the sound having the same frequency that has been detected at least the predetermined number of times is reduced or removed. During the execution of the speaker function, Steps from S601 through S603 are preferably repeated.

The present inventors have noted that, in an electronic device utilizing the vibration body that generates air conduction sound and vibration sound, for example, howling tends to occur when the vibration of the vibration body is transmitted to a human body and the opening 42 of the microphone 7 is covered by the vibrating human body. Accordingly, in such an electronic device utilizing the vibration body that generates air conduction sound and vibration sound, the aforementioned howling reduction processing is effective.

Furthermore, the present inventors have found that, when there is a single sound path (the opening 42) from outside of the housing to the microphone disposed inside of the housing as an input routing of sound to the microphone 7, howling due to blockage of the path for entry of the sound to the microphone tends to occur. Accordingly, in such an electronic device, the howling reduction processing is effective.

In the low frequency band, it takes a longer period of time than in high frequency band to complete detection of the same predetermined number of times due to whether the frequency is high or low. In view of the above, howling may be detected separately in the low frequency band and in the high frequency band. By doing so, howling is detected earlier in the high frequency band than in the low frequency band, and the howling reduction processing may be performed in the high frequency band without having to wait for a result of the detection in the low frequency band.

Furthermore, the aforementioned predetermined number of times may be set differently with respect to the howling reduction processing performed in the low frequency band and the howling reduction processing performed in the high frequency band. For example, the predetermined number of times in the low frequency band is preferably less than the predetermined number of times in the high frequency band. In the above case, compared with a case where the same predetermined number of times is set as the threshold value in the low frequency band and in the high frequency band, the detection of a howling condition in the low frequency band is performed without a significant delay from the detection of the howling condition in the high frequency band.

Moreover, the low frequency band used for the detection may overlap with the high frequency band used for the detection. The above case prevents presence of an undetected frequency band.

Although the present invention has been described based on the drawings and the embodiments thereof, it should be noted that a person skilled in the art may easily make various changes and modifications according to the present disclosure. Therefore, such changes and modifications are to be understood as included within the scope of the present invention. For example, functions and the like included in the components and steps may be rearranged as long as the functions and the like are logically consistent. A plurality of component parts, the steps, and the like may also be integrated or separated.

Although in the above electronic device 1 the piezoelectric element 30 is adhered to the panel 10, the piezoelectric element 30 may be attached to another place than the panel 10.

The panel 10 may form a part or an entirety of any one of a display panel, an operation panel, the cover panel, and a lid panel that allows a rechargeable battery to be detachable. Preferably, when the panel 10 is the display panel, the piezoelectric element 30 is disposed outside of a display area provided for a display function. The above structure provides an advantage that display is less likely to be disturbed. The operation panel may also include a sheet key, namely, a component of the folding mobile phone illustrated in FIGS. 3A to 3C or the like that is integrally provided with a key top as the operation key and that forms one surface of the housing on an operational side (the lower side).

In the above embodiments, the joining member used for adhering the panel 10 and the piezoelectric element 30, the joining member used for adhering the panel 10 and the housing 60 (60a), and the like are denoted by the same reference numeral as the joining member 70. However, the joining members may be different depending on the components to be joined, as appropriate.

REFERENCE SIGNS 1 electronic device
5 wireless communicator
7 microphone
10 panel
20 display
30 piezoelectric element
40 input unit
42 opening
43 circuit substrate
44 sound collection opening
50 controller
60, 60a, 60b housing
70 joining member
80 reinforcing member
90 support portion
130 circuit substrate

The invention claimed is:

1. An electronic device, comprising:
a housing;
a vibration body disposed in the housing; and
a microphone disposed in the housing, wherein
when air conduction sound and vibration sound that conducts through a human body is generated by vibrating the vibration body, howling reduction processing is performed,
the vibration body includes a piezoelectric element, and a panel configured to support the piezoelectric element,
the panel is held by the housing,
the panel forms a part or an entirety of any of a display, an input unit, and a cover of the display, and
a portion of the panel where the piezoelectric element is fixed is located outside of a portion of the panel that overlaps with the display in a planar view.

2. The electronic device of claim 1, wherein the howling reduction processing is performed when sound collected by the microphone includes a sound having the same frequency at least a predetermined number of times in a predetermined period of time.

3. The electronic device of claim 1, wherein the howling reduction processing is performed with respect to a low frequency band ranging from 300 Hz to 1.5 kHz.

4. The electronic device of claim 1, wherein the howling reduction processing is performed with respect to a high frequency band ranging from 1 kHz to 20 kHz.

5. The electronic device of claim 1, wherein the howling reduction processing is performed by removing, from a sound to be reproduced by vibrating the vibration body, the sound having the same frequency that is detected at least a predetermined number of times in a predetermined period of time.

6. The electronic device of claim 1, further including a voice communication function, wherein
the howling reduction processing is performed while a voice communication is in progress.

7. The electronic device of claim 1, further including:
a hearing aid function, wherein
the howling reduction processing is performed during execution of the hearing aid function.

8. The electronic device of claim 1, wherein
the vibration body may be pressed with pressure ranging from 3N to 10N.

9. The electronic device of claim 1, wherein
the microphone is disposed in a position that is to be covered by a user.

10. The electronic device of claim 1, wherein
the howling reduction processing is performed in a low frequency band and the howling reduction processing is performed in a high frequency band.

11. The electronic device of claim 10, wherein
the howling reduction processing is performed when sound collected by the microphone includes a sound having the same frequency at least a predetermined number of times in a predetermined period of time, and
the predetermined number of times is set differently in the low frequency band and in the high frequency band.

12. The electronic device of claim 1, wherein
the microphone includes a single opening.

13. The electronic device of claim 1, wherein
the piezoelectric element is disposed on one end side of the housing in one direction thereof.

14. The electronic device of claim 1, wherein
the panel has a rectangular shape in a planar view, a length of each of the two opposing sides of the rectangular shape being greater than or equal to a length from an antitragus to an inferior crus of antihelix.

15. The electronic device of claim 14, wherein
the panel has other two opposing sides, a length of each of the other two opposing sides being greater than or equal to a length from a tragus to an antihelix.

16. The electronic device of claim 1, wherein
the piezoelectric element is fixed such that the piezoelectric element is joined to the housing by a joining member.

17. The electronic device of claim 16, wherein
the joining member comprises an adhesive agent that is not thermosetting.

18. The electronic device of claim 16, wherein
the joining member comprises a double-sided adhesive tape.

19. The electronic device of claim 1, wherein
the panel is joined to the housing by a joining member.

20. The electronic device of claim 19, wherein
the joining member comprises an adhesive agent that is not thermosetting.

21. The electronic device of claim 19, wherein
the joining member comprises a double-sided adhesive tape.

22. The electronic device of claim 1, wherein
the display is fixed to the panel from an inside of the housing.

* * * * *